(12) United States Patent
Bottomley et al.

(10) Patent No.: US 7,738,534 B2
(45) Date of Patent: *Jun. 15, 2010

(54) MULTI-TRANSMITTER INTERFERENCE SUPPRESSION USING CODE-SPECIFIC COMBINING

(75) Inventors: Gregory E. Bottomley, Cary, NC (US); Yi-Pin Eric Wang, Cary, NC (US)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 148 days.

This patent is subject to a terminal disclaimer.

(21) Appl. No.: 11/566,820

(22) Filed: Dec. 5, 2006

(65) Prior Publication Data

US 2007/0104254 A1     May 10, 2007

Related U.S. Application Data (63) Continuation-in-part of application No. 10/720,492, filed on Nov. 24, 2003.

(51) Int. Cl.
*H04B 1/707* (2006.01)
(52) U.S. Cl. ...................................... 375/148
(58) Field of Classification Search ................. 375/147, 375/148, 152, 150, 130, 316, 140, 346
See application file for complete search history.

(56) References Cited

U.S. PATENT DOCUMENTS

| | | | |
|---|---|---|---|
| 5,754,583 A * | 5/1998 | Eberhardt et al. ........... | 375/147 |
| 6,222,833 B1 * | 4/2001 | Seo ............................. | 370/342 |
| 6,625,136 B1 * | 9/2003 | Niegel et al. ................ | 370/335 |
| 6,801,565 B1 | 10/2004 | Bottomley et al. | |
| 7,236,515 B1 * | 6/2007 | Pope .......................... | 375/147 |
| 7,397,842 B2 * | 7/2008 | Bottomley et al. ......... | 375/148 |
| 2001/0053177 A1 * | 12/2001 | Papasakellariou .......... | 375/142 |
| 2004/0017311 A1 | 1/2004 | Thomas et al. | |
| 2004/0030534 A1 | 2/2004 | Thomas et al. | |

(Continued)

FOREIGN PATENT DOCUMENTS

WO     WO 0154322 A2 *   7/2001

(Continued)

OTHER PUBLICATIONS

Co-pending U.S. Appl. No. 11/566,756, filed Dec. 5, 2006.

(Continued)

*Primary Examiner*—Kevin M Burd
(74) *Attorney, Agent, or Firm*—Coats & Bennett, P.L.L.C.

(57) ABSTRACT

Multi-transmitter interference caused by one or more interfering own-cell and/or other-cell transmitters is reduced in a RAKE-based receiver. The RAKE-based receiver comprises a plurality of RAKE fingers, a processor and a combiner. The plurality of RAKE fingers are configured to despread received symbols, wherein a delay for a first one of the plurality of RAKE fingers corresponds to a symbol of interest transmitted by a first transmitter and a delay for a second one of the plurality of RAKE fingers corresponds to an interfering symbol transmitted by a second transmitter. The processor is configured to determine a cross-correlation between the symbol of interest and the interfering symbol. The combiner is configured to combine the symbol of interest with the interfering symbol using the cross-correlation to reduce interference attributable to the interfering symbol from the symbol of interest.

27 Claims, 7 Drawing Sheets

U.S. PATENT DOCUMENTS

| | | | |
|---|---|---|---|
| 2004/0052305 | A1 | 3/2004 | Olson et al. |
| 2004/0146093 | A1 | 7/2004 | Olson et al. |
| 2004/0151238 | A1 | 8/2004 | Masenten |
| 2004/0213332 | A1* | 10/2004 | Doetsch et al. ............ 375/147 |
| 2005/0078742 | A1 | 4/2005 | Cairns et al. |
| 2005/0111528 | A1 | 5/2005 | Fulghum et al. |
| 2005/0201447 | A1 | 9/2005 | Cairns et al. |
| 2005/0215218 | A1 | 9/2005 | Bottomley et al. |
| 2006/0007990 | A1 | 1/2006 | Cozzo et al. |
| 2007/0263704 | A1 | 11/2007 | Nagarajan et al. |

FOREIGN PATENT DOCUMENTS

| | | |
|---|---|---|
| WO | 2004036811 | 4/2004 |
| WO | 2004036812 | 4/2004 |
| WO | 2005/055457 A1 | 6/2005 |

OTHER PUBLICATIONS

Co-pending U.S. Appl. No. 11/681,302, filed Mar. 2, 2007.

Lu, H.-Y. et al. "A Hybrid of Space Time Coding and Orthogonal Zero Padding for Multirate CDMA." 2004 IEEE 59th Vehicular Technology Conference (VTC 2004—Spring). May 17-19, 2004, vol. 1, pp. 405-409.

Wang, Y.-P. E. et al. "Generalized RAKE Reception for Cancelling Interference from Multiple Base Stations." 2000 IEEE 52nd Vehicular Technology Conference (VTC 2000—Fall). Sep. 24-28, 2000, vol. 5, pp. 2333-2339.

Affes, S. et al. "Interference Subspace Rejection: A Framework for Multiuser Detection in Wideband CDMA." IEEE Journal on Selected Areas in Communications, vol. 20, No. 2, Feb. 2002, pp. 287-302.

Ghauri, I. et al. "Blind Channel Identification and Projection Receiver Determination for Multicode and Multirate Situations in DS-CDMA Systems." In Proc. IEEE Intl. Conf. Acoustics, Speech and Sig. Proc. (ICASSP), Salt Lake City, UT, USA, May 7-11, 2005, pp. 2197-2200.

Madkour, Mohamed F. et al. "Successive Interference Cancellation Algorithms for Downlink W-CDMA Communications." IEEE Transactions on Wireless Communications, vol. 1, No. 1, Jan. 2002, pp. 169-177.

Hansen, H. et al. "High Capacity Downlink Transmission with MIMO Interference Subspace Rejection in Multicellular CDMA Networks." EURASIP Journal on Applied Signal Processing, 2004:5, pp. 707-726.

Zhang, Q. T. et al. "A Unified Approach to Multirate Detection for Cellular Systems in Fast-Fading Channels." IEEE Trans. Wireless Communications, vol. 2, pp. 1702-1710, Sep. 2004.

* cited by examiner

MULTI-TRANSMITTER INTERFERENCE SUPPRESSION USING CODE-SPECIFIC COMBINING

CROSS REFERENCE TO RELATED APPLICATIONS

This application is a continuation-in-part of prior application Ser. No. 10/720,492, filed Nov. 24, 2003, which is incorporated herein by reference in its entirety.

BACKGROUND

The present invention relates generally to RAKE receivers and particularly to RAKE receivers that suppress multi-transmitter interference.

RAKE receivers represent a well-known approach to multi-path reception, particularly in Direct Sequence Code Division Multiple Access (DS-CDMA) wireless communication. In a multi-path communication channel, a transmitted signal travels through multiple propagation paths to the receiver. Thus, the receiver receives multiple "echoes" of the transmitted signal, with each multi-path echo generally suffering from different path delay, phase, and attenuation effects.

RAKE receivers exploit multi-path propagation by assigning each of two or more RAKE "fingers" to one of the incoming multi-path echoes. Each finger is tuned to a particular multi-path echo. By estimating the channel effects, e.g., phase and attenuation, and by properly accounting for the differences in path delays, the individual output from each RAKE finger may be combined with the outputs from the other fingers to provide a combined RAKE output signal with a greatly improved signal-to-noise ratio (SNR).

In DS-CDMA systems, such as Wideband CDMA (WCDMA), CDMA-2000 and 1XEV-DO, high transmission data rates are achieved by transmitting data at a low spreading factor and/or on more than one spreading code (multi-code). When a low spreading factor and/or multi-code is used, performance is sensitive to multi-path dispersion. With dispersion, there are multiple echoes of the transmitted signal with different relative delays. These echoes interfere with one another. Not only is orthogonality lost between successive symbols as one symbol overlaps with the next, but orthogonality is also lost between symbols sent on different, orthogonal codes, e.g., symbols transmitted to the same user or to different users.

As a result, performance is often limited by interference between different symbols being sent to the same user and/or different users. There are two predominant types of symbol interference: self-interference and multi-transmitter interference. Self-interference occurs when other desired symbols sent in parallel (multi-code) or in series (previous, next symbols) by a transmitter of interest interfere with a symbol of interest. A transmitter of interest is the device from which a receiving device expects to receive data, e.g., a base station serving the cell in which the user is located. All other transmitters are considered interferers in that their symbol transmissions are not of interest to the receiving device and may interfere with a symbol of interest.

Multi-transmitter interference occurs when symbol transmissions originated by one or more interfering transmitters adversely affect a symbol of interest. Interfering transmitters may reside within the same cell as the receiving device or in other cells. For example, multi-transmitter interference in the downlink arises when other-user symbols sent from the same base station interfere with a symbol of interest (own-cell interference). Multi-transmitter interference also arises when other-user symbols sent by a different base station interfere with a symbol of interest (other-cell interference). Nearby mobile devices located in the same or different cell may also cause multi-transmitter interference in the uplink.

A key aspect of symbol interference is that it varies from symbol to symbol. This variation is due to the spreading codes being a combination of Walsh codes and a cell-specific common scrambling code. The scrambling code has a period much longer than the symbol period, which effectively changes the overall spreading code from symbol period to symbol period. In addition, symbols targeted for different users are encoded using different spreading codes.

SUMMARY

The present application discloses a method and apparatus for reducing interference from a symbol of interest in a RAKE receiver. The RAKE receiver comprises a plurality of RAKE fingers, a processor, and a combiner. The plurality of RAKE fingers are configured to despread received symbols, wherein a delay for a first one of the plurality of RAKE fingers corresponds to a symbol of interest transmitted by a first transmitter and a delay for a second one of the plurality of RAKE fingers corresponds to an interfering symbol transmitted by a second transmitter. The processor is configured to determine a cross-correlation between the symbol of interest and the interfering symbol. The combiner is configured to combine the symbol of interest with the interfering symbol using the cross-correlation to reduce interference attributable to the interfering symbol from the symbol of interest.

Of course, the present invention is not limited to the above features and advantages. Those skilled in the art will recognize additional features and advantages upon reading the following detailed description, and upon viewing the accompanying drawings.

DETAILED DESCRIPTION

Figure 1:
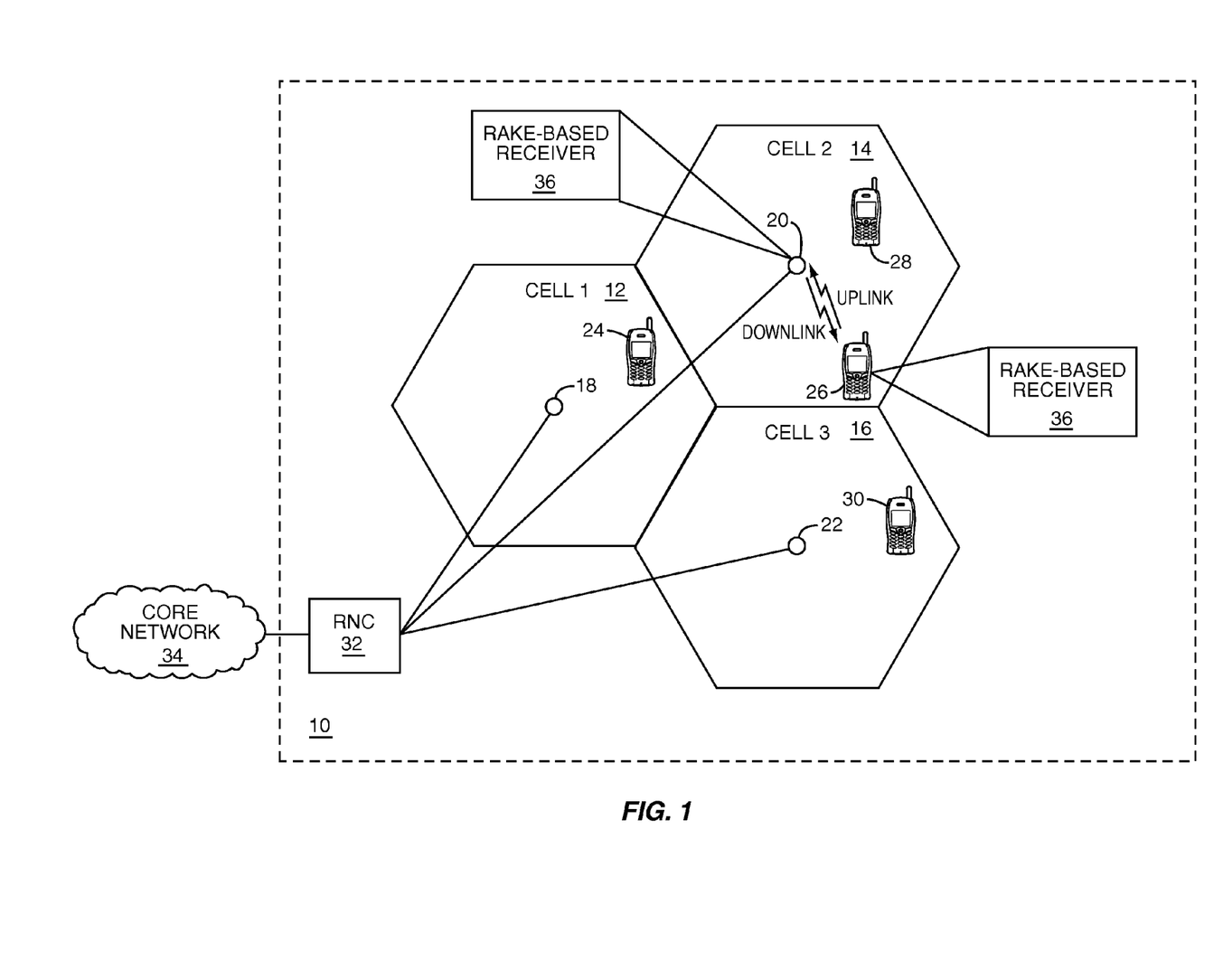
FIG. 1 is a block diagram of one embodiment of a wireless network including devices that suppress multi-transmitter interference.

FIG. 1 illustrates an embodiment of a wireless communication network 10. The network 10 provides wireless services to various cells 12, 14 and 16. To that end, radio base stations 18, 20 and 22 provide radio resources to and maintain radio links with respective mobile devices 24, 26, 28 and 30 such as cellular phones. A radio network controller 32 controls the base stations 18, 20 and 22, manages radio network resources, and provides interfaces to the base stations 18, 20 and 22, other wireless networks (not shown) and a core network 34 such as the public switched telephone network and/or the Internet.

Code channels are established between respective ones of the base stations 18, 20 and 22 and mobile devices 24, 26, 28 and 30 to facilitate wireless communication. Symbols, which are encoded using a spreading code, propagate in parallel (multi-code) or in series from transmitting to receiving devices via one or more code channels. In a downlink configuration (also referred to as forward link), one or more of the base stations 18, 20 and 22 provide data services to respective ones of the mobile devices 24, 26, 28 and 30 via downlink code channels, e.g., in accordance with the W-CDMA HSDPA protocol. In an uplink configuration (also referred to as reverse link), one or more of the mobile device 24, 26, 28 and 30 sends data to a respective one of the base stations 18, 20 and 22 via an uplink code channel, e.g., in accordance with the W-CDMA High-Speed Uplink Packet Access (HSUPA) protocol. In either configuration, symbols intended for the receiving device may be subjected to multi-transmitter interference.

For example, in FIG. 1, downlink and uplink code channels are formed between mobile device 26 located in the second cell 14 and the base station 20 serving the second cell 14. During downlink communication, symbols transmitted to the mobile device 26 are subjected to multi-transmitter interference caused by base stations 18 and 22 which serve the first and third cells 18 and 22, respectively. Likewise, during uplink communication, symbols transmitted to the serving base station 20 from the mobile device 26 are subjected to multi-transmitter interference from mobile devices 24, 28 and 30. Accordingly, the mobile device 26 and the corresponding serving base station 20 each have a RAKE-based receiver 36 for suppressing multi-transmitter interference (the other mobile devices 24, 28 and 30 and base stations 18 and 22 shown in FIG. 1 may also include RAKE-based receiver 36). The RAKE-based receiver 36 despreads symbols transmitted by interfering transmitters and uses despread interfering symbols to suppress multi-transmitter interference from a symbol of interest.

The RAKE-based receiver 36 may be architecturally implemented in various ways. In one embodiment, the RAKE-based receiver 36 is a Multi-code-RAKE (M-RAKE) receiver of the kind disclosed in application Ser. No. 10/720, 492. This embodiment may optionally utilize pre-combining where some despread symbol values are pre-combined while others are not as is described in more detail later. In another embodiment, the RAKE-based receiver 36 is a restricted M-RAKE receiver of the kind disclosed in application Ser. No. 10/720,492. In yet another embodiment, the RAKE-based receiver 36 is a Multi-Code Linear Equalizer (MC-LEQ) receiver of the kind disclosed in application Ser. No. 10/720,492. Regardless, in each embodiment, symbols originated from interfering transmitters are processed by the RAKE-based receiver 36 to suppress multi-transmitter interference from a symbol of interest.

Figure 2:
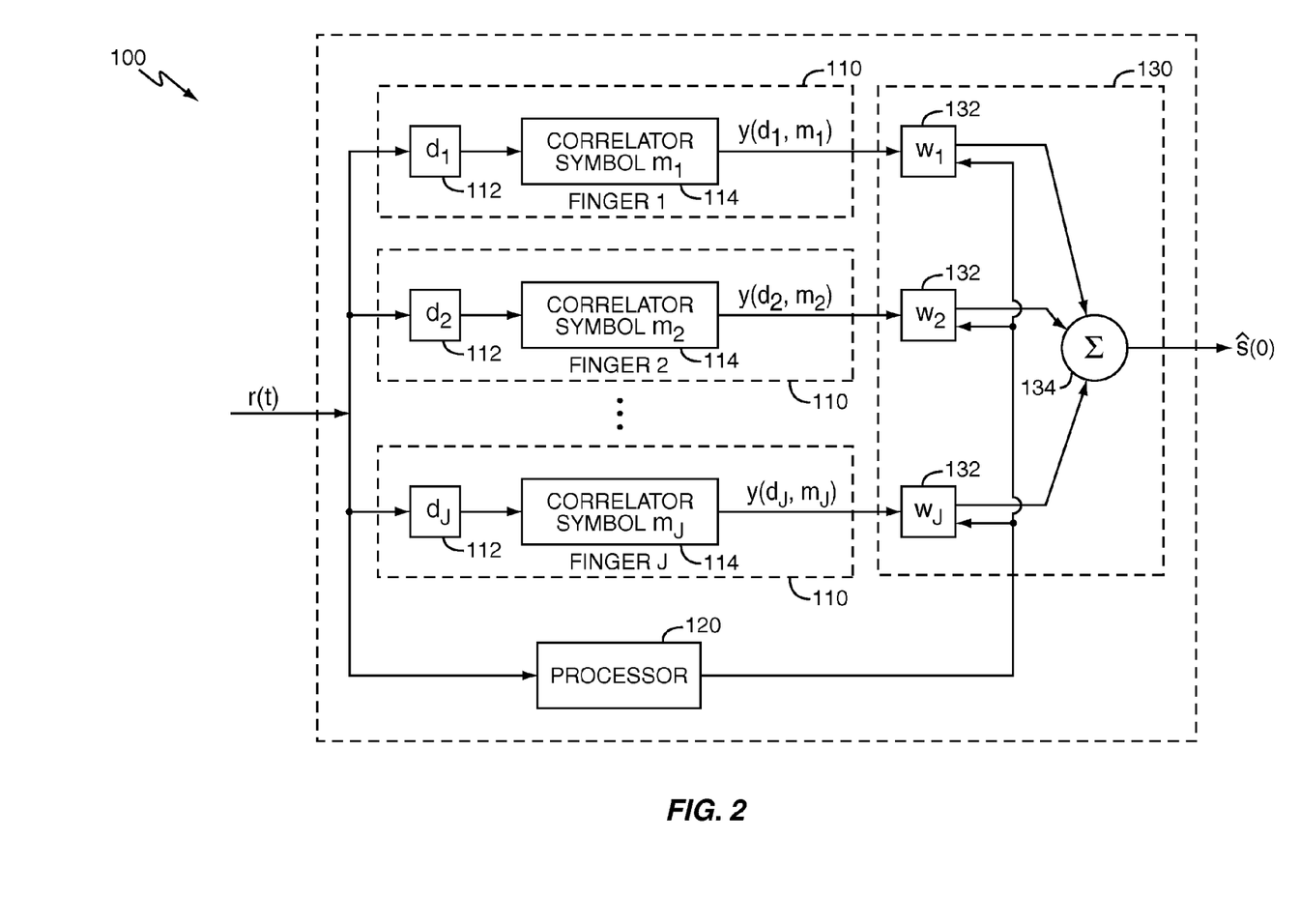
FIG. 2 is a block diagram of one embodiment of a multi-symbol RAKE (M-RAKE) receiver that suppresses multi-transmitter interference.

FIG. 2 illustrates an M-RAKE embodiment of the RAKE-based receiver 36. M-RAKE receiver 100 comprises a plurality of RAKE fingers 110, a RAKE processor 120 and a RAKE combiner 130. A baseband signal r(t) is processed by the M-RAKE receiver 100 and comprises streams of sample values obtained from wireless signals received by one or more antennas (not shown). The baseband signal r(t) typically comprises a composite signal that includes one or more multi-path echoes arising from multi-path propagation and which arrive at the receiver 100 from different directions and with different time delays. The baseband signal r(t) may further include components associated with one or more interfering transmitters. The receiver 100 generates a reduced-interference estimate ŝ(m) of each transmitted symbol of interest s(m) from the baseband signal r(t).

To that end, each RAKE finger 110 includes a delay element 112 having a delay (d) and a correlator 114 that uses a particular despreading code. The RAKE fingers 110 generate despread symbol values y(d,m) for particular symbols (m) based on their respective delays and despreading codes. The combiner 130 combines despread values to estimate a symbol of interest with reduced interference. The combiner 130 has a plurality of weighting elements 132 for weighting the RAKE finger outputs and a summer 134 for combining the outputs of the weighting elements 132 to generate symbol estimates. The RAKE processor 120 calculates the weighting element combining weights to cancel or reduce self-interference and multi-transmitter interference.

In more detail, some RAKE fingers 110 despread desired symbols using the despreading code and path delays associated with the desired symbols. Other RAKE fingers 110 whiten own-cell interference and have delays offset from the path delays associated with the desired symbols and use despreading codes associated with the desired symbols. Still other RAKE fingers 110 despread interfering symbols such as other desired symbols (multi-code symbols and/or previous/ next symbols) and symbols transmitted by interfering transmitters. Accordingly, both own-cell and other-cell multi-transmitter interference may be suppressed.

To suppress own-cell multi-transmitter interference, interfering symbols are despread using codes corresponding to one or more own-cell interfering transmitters and conventional G-RAKE finger delays, possibly offset by one or more symbol periods. To suppress other-cell multi-transmitter interference, interfering symbols are despread using codes corresponding to one or more other-cell interfering transmitters and path delays preferably corresponding to the path delays associated with the other (interfering) cells. Own-cell and other-cell path delays may be determined from common pilot signals transmitted from different base stations or pilot symbols transmitted from different uplink users as is well known in the art. The M-RAKE receiver 100 may be provided despreading codes associated with interfering transmitters. Alternatively, the M-RAKE receiver 100 may detect despreading codes associated with interfering transmitters, e.g., by searching for Orthogonal Variable Spreading Factor (OVSF) codes in use.

During operation, each RAKE finger 110 generates despread values as given by:

$$y_m = \sum_{j=0}^{N_T-1} \sum_{i} \sum_{k=0}^{K-1} h_{i,k,j,m} s(i, k, j) + n_m \qquad (1)$$

where j denotes interfering transmitter, i denotes time (symbol period), k denotes despreading code (multi-code), m denotes the symbol of interest, h denotes the code-specific net channel response, s denotes modem symbol value, and n denotes noise. Generally speaking, h comprises the composite channel impulse response associated with the $i^{th}$ symbol transmitted by the $j^{th}$ transmitter.

The expression for $y_m$ in equation (1) may be simplified by combining the summations associated with j (interfering transmitters) and k (multi-codes) into one summation as given by:

$$y_m = \sum_i \sum_{k'=0}^{K'-1} h_{i,k(k'),j(k'),m} s(i, k(k'), j(k')) + n_m \quad (2)$$

where K' corresponds to a total of $KN_T$ multi-codes from $N_T$ interfering transmitters. Consider, for example, symbol s(0, 0,0) as the symbol of interest. Then $y=h_{0,0,0}s(0,0,0)+u$, where u is given by:

$$u = \sum_i \sum_{\substack{k'=0 \\ (i,k') \neq (0,0)}}^{K'-1} h_{i,k(k'),j(k')} s(i, k(k'), j(k')) + n \quad (3)$$

The covariance of u may be given by:

$$R_u = \sum_i \sum_{\substack{k'=0 \\ (i,k') \neq (0,0)}}^{K'-1} h_{i,k(k'),j(k')} h_{i,k(k'),j(k')}^H + E[nn^H] \quad (4)$$

The RAKE processor 120 uses the code-specific impairment covariance $R_u$ to determine the combining weights associated with the weighting elements 132 of the RAKE combiner 130. In one embodiment, the RAKE processor 120 uses $R_u$ to determine Maximum Likelihood (ML) based combining weights as given by:

$$w = R_u^{-1} h_{0,0,0} \quad (5)$$

In another embodiment, the RAKE processor 120 uses $R_y$ to determine Minimum Mean-Square Error (MMSE) based combining weights as given by:

$$v = R_y^{-1} h_{0,0,0} \quad (6)$$

where $$R_y = \sum_i \sum_{k'=0}^{K'-1} h_{i,k(k'),j(k')} h_{i,k(k'),j(k')}^H + E[nn^H] \quad (7)$$

Notably, both $R_u$ and $R_y$ depend on the channel responses $h_{i,k(k'),j(k')}$ associated with interfering transmitters as indicated by the index j. They also depend on $E[nn^H]$, which can be expressed as a noise covariance matrix. Preferably, $R_u$ and $R_y$ are formed using the parametric approach described in U.S. patent application Ser. No. 11/566,756 entitled "METHOD AND APPARATUS FOR SUPPRESSING INTERFERENCE BASED ON CHANNELIZATION CODE POWER ESTIMATION WITH BIAS REMOVAL" to Bottomley et al. filed on Dec. 5, 2006, the contents of which are incorporated herein by reference in their entirety.

Optionally, subsets of the RAKE finger outputs may be pre-combined. Pre-combined values are then combined with the remaining RAKE finger outputs in a second stage. Pre-combining results may be buffered in a linear transversal filter (not shown), thus allowing results from different symbol periods to be efficiently stored and used in the second stage. Preferably, RAKE fingers 110 associated with different despread values of the same interfering symbol are pre-combined to produce a symbol estimate. With partial pre-combining, pre-combined interference symbol estimates are then combined with the desired symbol despread values. With full pre-combining, desired symbol despread values are also pre-combined.

In one embodiment, pre-combining is performed in accordance with the MC-LEQ teachings disclosed in application Ser. No. 10/720,492. In another embodiment, G-RAKE combining is performed where an impairment covariance matrix is used to form combining weights, e.g., by fitting a model of a measured covariance matrix from pilot symbols associated with the symbol being estimated. Regardless of the pre-combining technique used, let $f_k$ denote the combining weights used to pre-combine fingers 110 in group k and let $y_k$ be the despread values in group k. Accordingly, the output of the pre-combining is given by:

$$z_k = f_k^H y_k \quad (8)$$

For partial pre-combining, some groups have only a single finger 110 with an effective pre-combining weight of one. As such, the expression given in equation (8) may be rewritten in terms of all elements in y to give a simple expression for the next stage of combining, where zero values are used to combine fingers 110 not in group k. The output of the pre-combining is given by:

$$z_k = g_k^H y \quad (9)$$

where $g_k$ is a zero-padded extension of $f_k$. In the combining stage, pre-combined values are combined using a weight vector v', such that the symbol estimate is given by:

$$\hat{s}(0) = (v')^H z \quad (10)$$

where v' is determined from primed values in (5) or (6). The primed cross-correlation matrix is then given by:

$$R'_u = \sum_{i \neq 0} h'_i h_i'^H + R'_n \quad (11)$$

where $R'_n$ is a noise correlation matrix. The precombined outputs are given by:

$$z_k = g_k^H h_0 s(0) + \sum_{i \neq 0} g_k^H h_i s(i) + g_k^H n \quad (12)$$

where s(i) represents interfering symbols which may be consecutive desired symbols and/or symbols transmitted by one or more interfering transmitters.

If there are K items in the combining stage, then vector z becomes:

$$z = \begin{bmatrix} z_1 \\ \vdots \\ z_K \end{bmatrix} = \begin{bmatrix} g_1^H h_0 \\ \vdots \\ g_K^H h_0 \end{bmatrix} s(0) + \sum_{i \neq 0} \begin{bmatrix} g_1^H h_i \\ \vdots \\ g_K^H h_K \end{bmatrix} s(i) + \begin{bmatrix} g_1^H n \\ \vdots \\ g_K^H n \end{bmatrix} \quad (13)$$

From equation (13), $h'_i$ may be defined as:

$$h'_i = [g_1^H h_i, \ldots, g_K^H h_i]^T \quad (14)$$

and the noise vector n' is given by:

$$n' = [g_1^H n, \ldots, g_K^H n]^T \quad (15)$$

The noise vector may be rewritten as:

$$n' = G^H n \quad (16)$$

where G is given by:

$$G = \begin{bmatrix} g_1 \\ \vdots \\ g_K \end{bmatrix} \quad (17)$$

The correlation matrix $R_{u'}$ associated with the noise vector may then be written as:

$$R_{n'} = G^H R_n G \quad (18)$$

Figure 3:
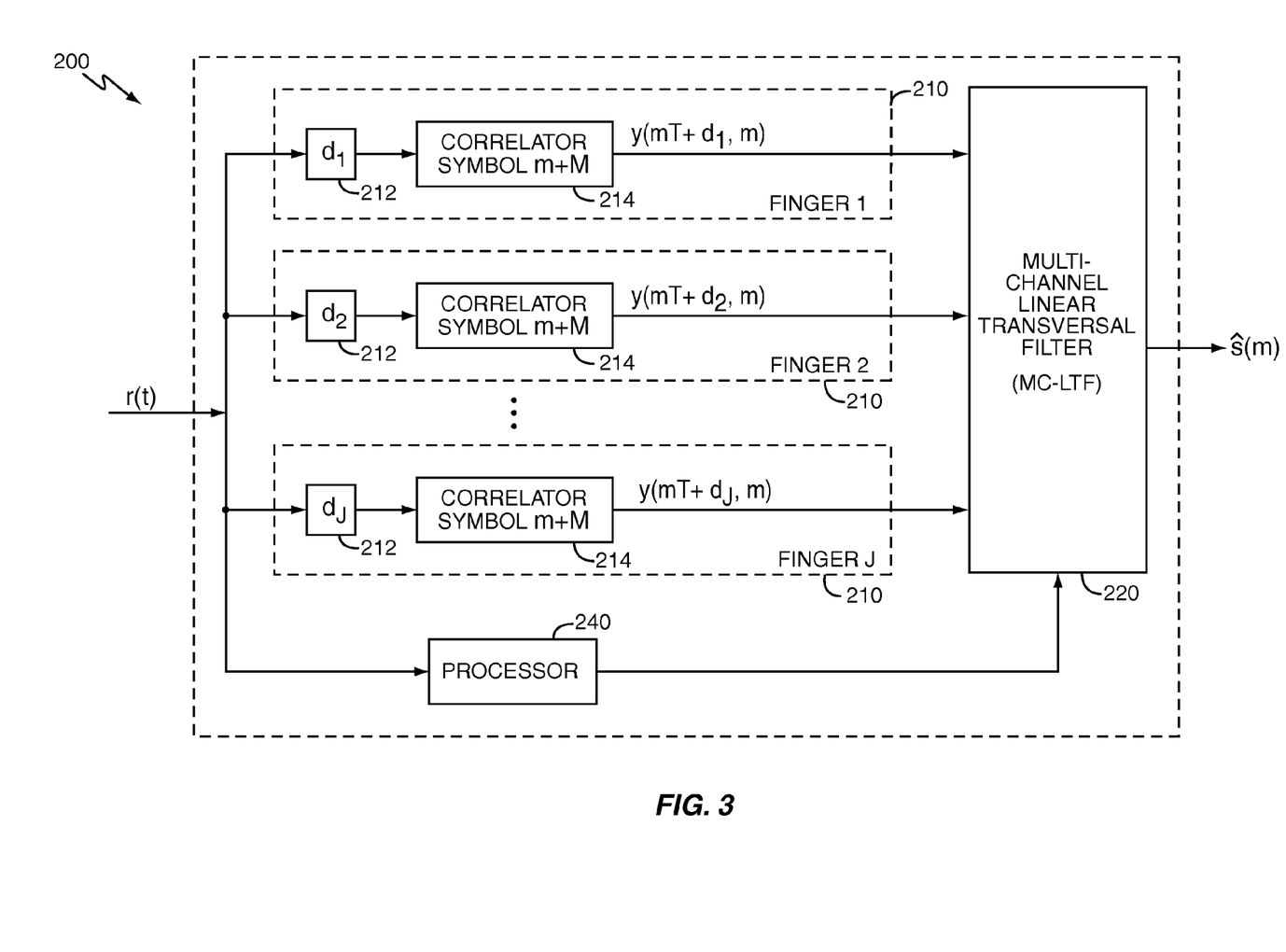
FIG. 3 is a block diagram of one embodiment of a restricted M-RAKE receiver that suppresses multi-transmitter interference.

Turning now to another version of the RAKE-based receiver 36, FIG. 3 illustrates a restricted M-RAKE embodiment of the receiver 36. Restricted M-RAKE receiver 200 comprises a plurality of RAKE fingers 210 and a multi-channel linear transversal filter (MC-LTF) 220. Similar to the M-RAKE embodiment, one or more of the RAKE fingers 210 correspond to symbols generated by interfering transmitters. Unlike the first embodiment, the MC-LTF 220 collects interfering symbol despread values from multiple symbol periods more efficiently.

Figure 4:
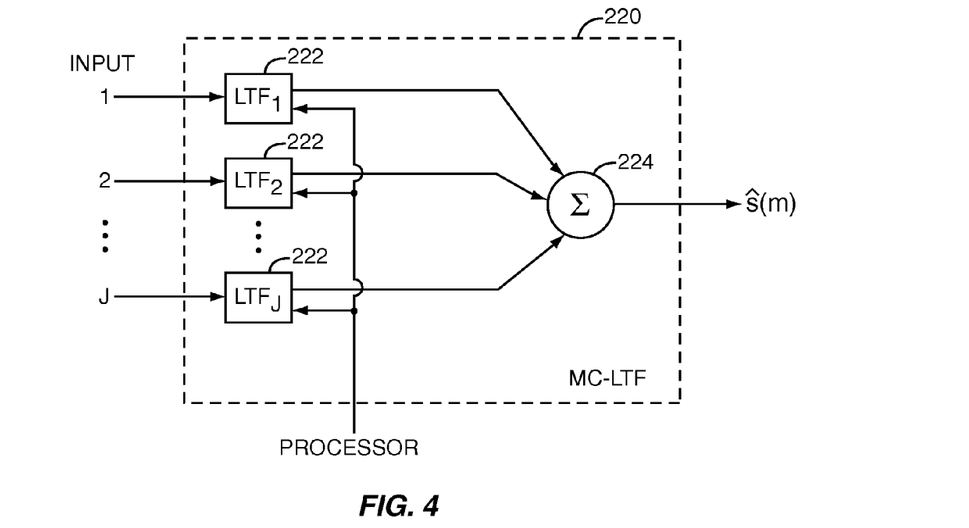
FIG. 4 illustrates an exemplary multi-channel linear transversal filter for the restricted M-RAKE of FIG. 3.

In more detail, each RAKE finger 210 includes a delay element 212 and a correlator 214. In this embodiment, the delays (d) associated with each RAKE finger 210 are chosen so that the despread symbols y(mT+d,m) output from each correlator 214 are time aligned. The despread symbols output from RAKE fingers 210 are input to the MC-LTF 220. In one embodiment as shown in FIG. 4, the MC-LTF 220 comprises a plurality of parallel linear transversal filters (LTFs) 222, each associated with a corresponding RAKE finger 210, and a summer 224 that adds the filtered outputs of each LTF 222 to generate a symbol estimate ŝ(m). Those skilled in the art will appreciate that other embodiments of the MC-LTF 220 are possible. In general, past finger outputs are stored and results from multiple fingers and multiple symbol periods are combined.

Figure 5:
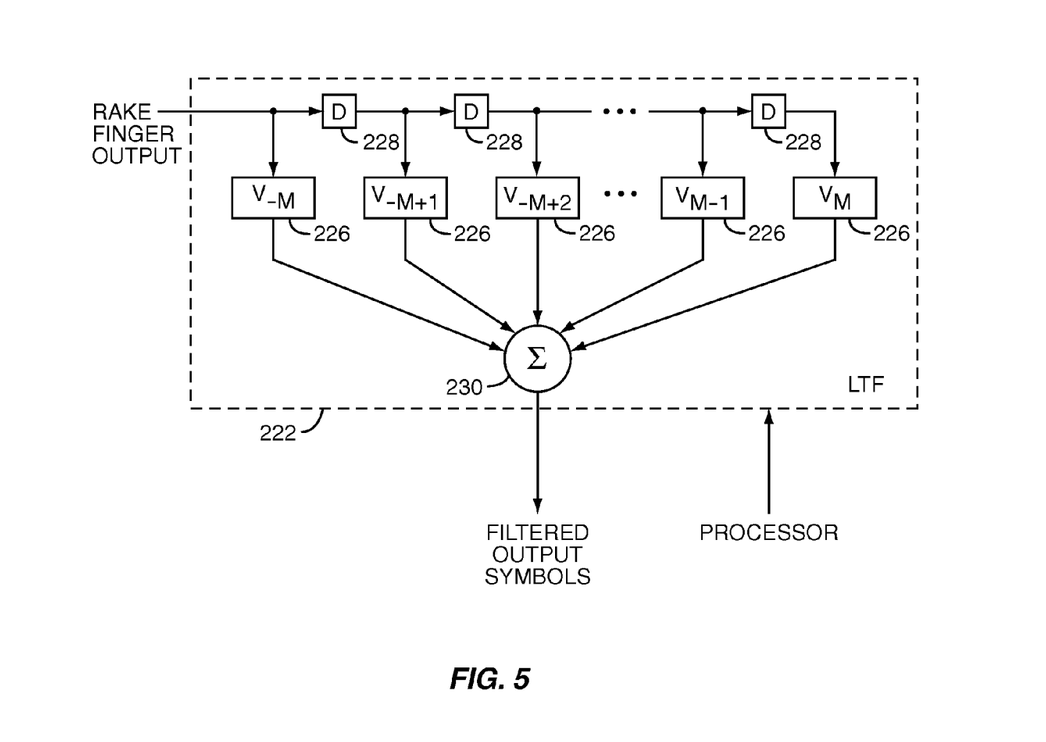
FIG. 5 illustrates an exemplary linear transversal filter for the multi-channel linear transversal filter of FIG. 4.

Each LTF 222 combines despread symbol values output from a corresponding RAKE finger 210 during a plurality of successive symbol periods mT as shown in FIG. 5. The despread symbols combined by each LTF 222 include a symbol of interest and interfering symbols such as desired previous and next symbols (self-interference) and/or symbols transmitted by interfering transmitters (multi-transmitter interference). The function of the LTFs 222 is to reduce interference in the symbol of interest as described in greater detail below. The filtered signals output from each LTF 222, referred to herein as filtered output signals, are added by summer 224 to generate the symbol estimates. The summer 224 performs a similar function as a summer in a conventional RAKE receiver to improve signal to noise ratio of the final symbol estimates.

Each LTF 222 comprises 2M+1 weighting elements 226, 2M delay elements 228, and LTF summer 230. Thus, when M equals 2, there will be four interfering symbols surrounding a symbol of interest s(m). Each LTF 222 receives and delays the despread symbols output from a corresponding RAKE finger 210 in a tapped delay line comprising the delay elements 228. The despread symbols may be corrupted by self-interference and/or multi-transmitter interference. During each symbol period, the LTF 222 weights and combines the despread symbols output during 2M+1 symbol periods centered on the symbol of interest s(m) in weighting elements 226 and the LTF summer 230.

The weighting factor for each weighting element 226 is solved for jointly in a single step by RAKE processor 240 based on the channel coefficients and cross-correlation between spreading codes. As the RAKE finger outputs are stored in MC-LTF 220, the vector of RAKE finger outputs are redefined according to the time they were produced. That is, the outputs of correlators 214, previously defined in equation (1), may be rewritten as:

$$y_m = h_0 s(0) + \sum_i \sum_{k'=0}^{K'-1} h_{i,k(k'),j(k'),m} s(i, k(k'), j(k')) + n_m \quad (19)$$

where h is the net channel response associated with the $i^{th}$ symbol transmitted by the $j^{th}$ transmitter as seen in the $m^{th}$ RAKE finger output vector, and where the symbol of interest is represented by s(0). The output of combiner 224 comprises the $m^{th}$-combined output of the RAKE finger outputs and may be defined as:

$$z_m = g_{j(m)}^H y_m \quad (20)$$

where, for example, the weighting and combining process simply comprises the complex conjugate of the coefficients of the channel taps in the interfering channels. The contents of the MC-LTF 220 may be represented in vector form as:

$$z = h'_0 s(0) + \sum_i \sum_{k'=0}^{K'-1} h'_{i,k(k'),j(k')} s(i, k(k'), j(k')) + n' \quad (21)$$

The estimate ŝ(0) of the symbol of interest may be represented as:

$$\hat{s}(0) = v^H z \quad (22)$$

The weight vector, v, in MC-LTF 220 may be calculated by:

$$v = R_{u'}^{-1} h'_0 \quad (23)$$

where the cross-correlation matrix $R_{u'}$ of the undesired portion of the signal may be given as:

$$R_u = \sum_{i \neq 0} h'_i h'^H_i + R'_n \quad (24)$$

The cross-correlation matrix $R_{u'}$ describes cross-correlations between the effective spreading codes for different symbols.

Figure 6:
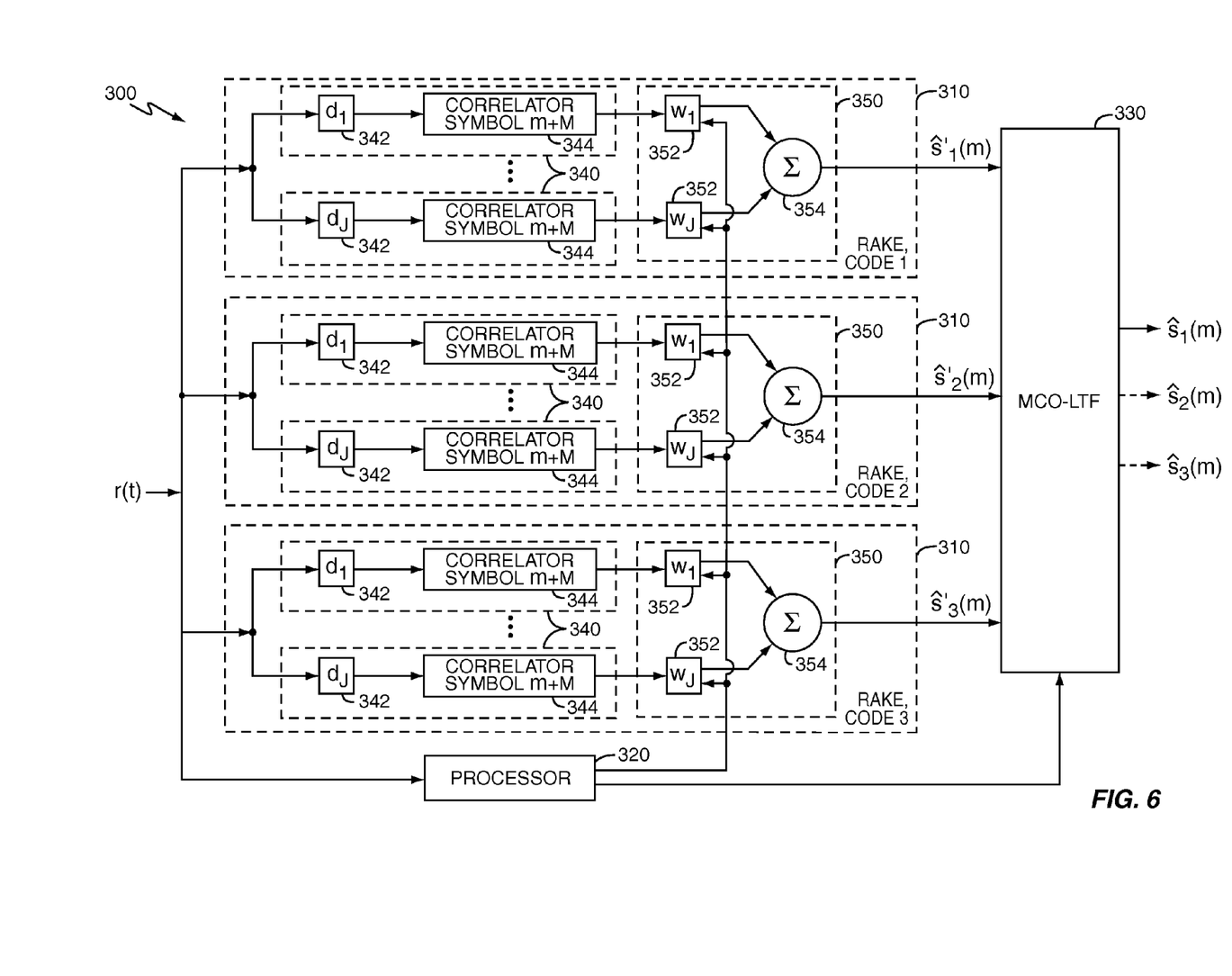
FIG. 6 is a block diagram of one embodiment of a multi-code linear equalizer that suppresses multi-transmitter interference.

FIG. 6 illustrates an MC-LEQ embodiment of the RAKE-based receiver 36. MC-LEQ receiver 300 comprises three G-RAKEs 310, each tuned to one of three code channels, a RAKE processor 320, and a multi-code linear transversal filter 330. Each G-RAKE 310 comprises a plurality of RAKE fingers 340 and a RAKE combiner 350. Each RAKE finger 340 includes a delay element 342 and a correlator 344. The delays for the delay elements 342 are chosen such that the output from each RAKE finger 340 is time aligned with the other RAKE fingers 340. The correlators 344 despread the received symbols, which are then weighted in weighting elements 352 and summed by summer 354. The weights applied by the weighting elements 352 are calculated according to a conventional RAKE or G-RAKE technique as is well known in the art. The MCO-LTF 330 combines the RAKE output symbols from each G-RAKE 310 using weighting factors determined based on cross-correlations between symbols derived from channel coefficients and cross-correlations between spreading codes or waveforms as previously described. Codes 1, 2, and 3 may be codes from the same or different transmitters.

Figure 7:
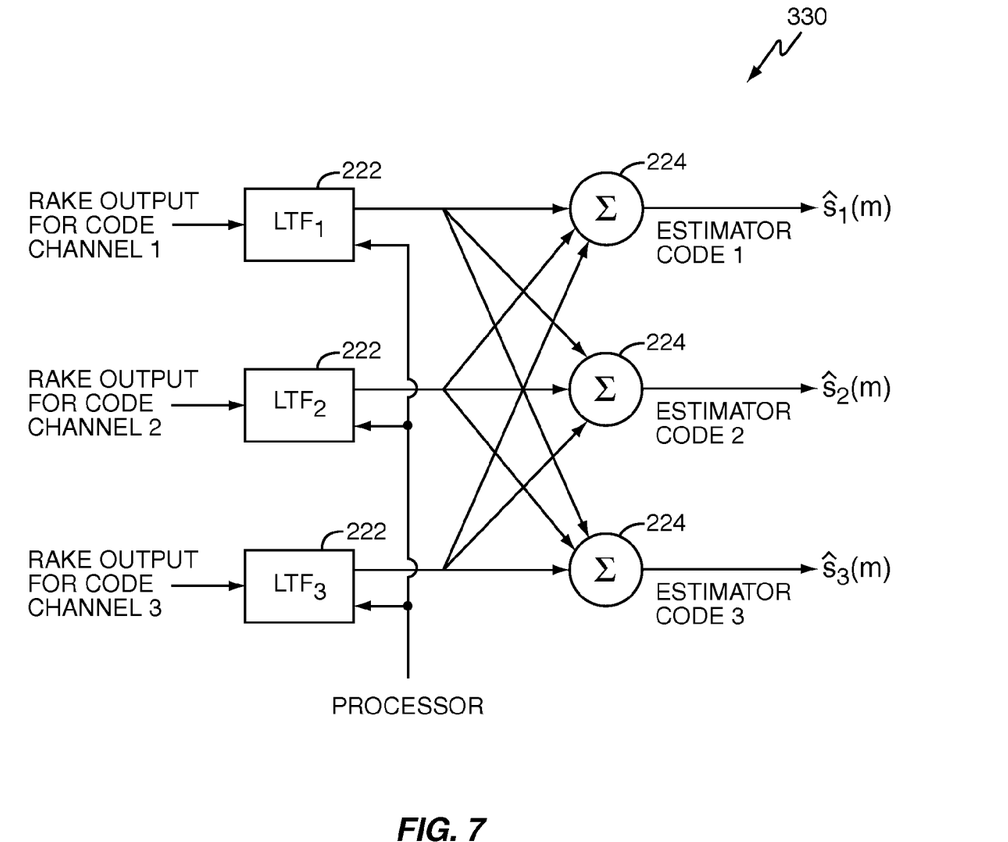
FIG. 7 is a block diagram of one embodiment of a multi-code-linear transversal filter included in or associated with the multi-code linear equalizer of FIG. 6.

FIG. 7 illustrates an exemplary embodiment of the MCO-LTF 330. The MCO-LTF 330 may, in one embodiment, comprise a plurality of linear transversal filters 222 as shown in FIG. 5. Each summer 224 included in the MCO-LTF 330 combines RAKE output symbols from all of the G-RAKEs 310 using weighting factors determined based on channel coefficients and cross-correlations between symbols. Each summer 224 outputs a single symbol estimate corresponding to a respective channel for each symbol period.

As discussed above, the weighting factors for LTFs 222 may be determined according to an ML solution. However, computational savings may be achieved if the ML solution is calculated as an MMSE solution, and then converted to an ML solution through a scaling of the combining weights (or final output), which can be calculated from elements of the MMSE solution.

In more detail, despread symbol values are given by equation (2). Using medium channel response estimates g as combining weights, the RAKE combined value for despread symbol m is given by:

$$z_m = g_{j(m)}^H y_m = \sum_{i} \sum_{k'=0}^{K'-1} g_{j(m)}^H h_{i,k(k'),j(k'),m} s(i, k(k'), j(k')) + g_{j(m)}^H n_m \quad (25)$$

where index j represents interfering transmitters as discussed previously. Next, RAKE combined values corresponding to time index $i_0-w \leq i \leq i_0+w$, despreading codes $k=1, 2, \ldots, K$, and interfering transmitters $j=1, 2, \ldots, N_T$ are collected into a vector as given by:

$$z = (z_{m_1}, z_{m_2}, \ldots, z_{m_M})^T = \sum_{i=i_0-W}^{i_0+W} \sum_{k'=0}^{K'-1} h'_{i,k(k'),j(k')} s(i, k(k'), j(k')) + n' \quad (26)$$

where h' may be expressed as:

$$h'_{i,k,j} = (g_{j(m_1)}^H h_{i,k,j,m_1}, g_{j(m_2)}^H h_{i,k,j,m_2}, \ldots, g_{j(m_M)}^H h_{i,k,j,m_M})^T \quad (27)$$

Accordingly, the noise vector n' may be expressed as:

$$n' = G^H n'' \quad (28)$$

where:

$$G = \begin{bmatrix} g_{j(m_1)} & 0 & \cdots & 0 \\ 0 & g_{j(m_2)} & \cdots & 0 \\ \vdots & \vdots & \ddots & \vdots \\ 0 & 0 & \cdots & g_{j(m_M)} \end{bmatrix} \quad (29)$$

and $$n'' = (n_{m_1}, n_{m_2}, \ldots, n_{m_M})^T \quad (30)$$

According to equation (29), matrix G depends on channel coefficients from multiple transmitters. If, for example, symbol (0,0,0) is the symbol of interest, then:

$$z = h'_{0,0,0} s(0,0,0) + u' \quad (31)$$

where:

$$u' = \sum_{\substack{i=i_0-W \\ (i,k') \neq (0,0)}}^{i_0+W} \sum_{k'=0}^{K'-1} h'_{i,k(k'),j(k')} s(i, k(k'), j(k')) + n' \quad (32)$$

An ML estimate of symbol s(0,0,0) can then be obtained from equations 22, 23 and 24.

Figure 8:
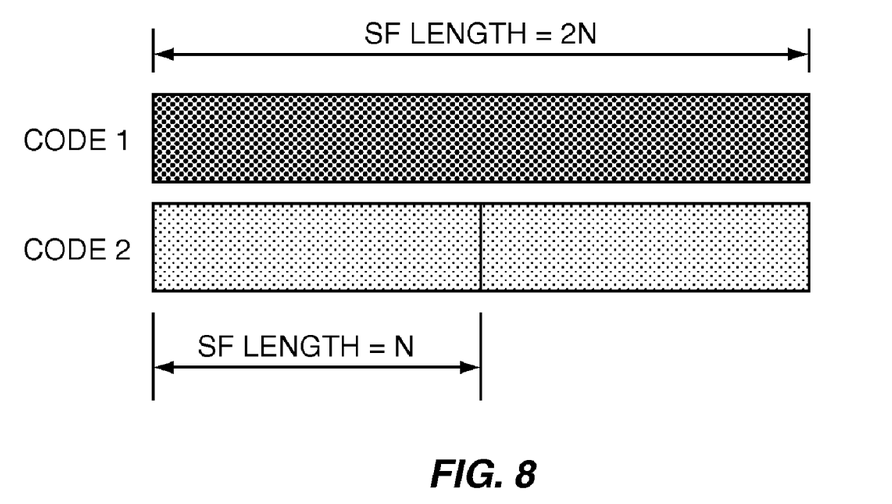
FIG. 8 illustrates exemplary despreading codes having spreading factors of different length.

The various RAKE-receiver embodiments disclosed herein may be extended to include use of despreading codes having spreading factors (SFs) of different lengths. For example, in FIG. 8, two despreading codes are shown, each associated with a different code channel. The first code (CODE 1) has a spreading factor twice the length of the second code (CODE 2). To maintain time alignment, the RAKE processors 120, 240, and 320 pad shorter despreading codes with extra zeroes so that all codes used by the RAKE fingers 110, 210, and 340 have spreading factors of equal length.

Figure 9:
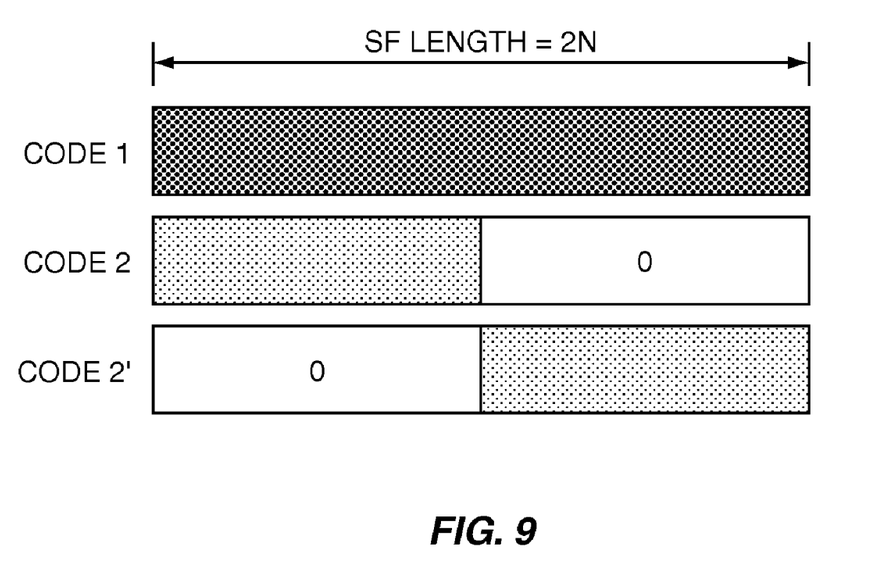
FIG. 9 illustrates the exemplary despreading codes of FIG. 8 after code padding.

FIG. 9 illustrates one embodiment of a despreading code that has been padded. A first despreading code (CODE 1) has a spreading factor of length 2N while a second code (CODE 2) has a spreading factor of length N. The second code is split into two virtual codes (CODE 2 and CODE 2'). Each virtual code is padded with extra zeroes so that their modified spreading factors have a length equal to that of the first code. Both virtual codes are used to process symbols associated with the corresponding code channel. By padding shorter despreading codes, all derivations discussed herein equally apply. As such, the RAKE-based receiver 36 may despread interfering symbols using despreading codes having the same length, different length, or some combination thereof. The despreading process itself may be performed in accordance with any known conventional technique.

With the above range of variations and applications in mind, it should be understood that the present invention is not limited by the foregoing description, nor is it limited by the accompanying drawings. Instead, the present invention is limited only by the following claims, and their legal equivalents.

What is claimed is:

1. A RAKE receiver for receiving signals in a multi-transmitter communication system comprising:
    a plurality of RAKE fingers configured to obtain despread values from received symbols, wherein a delay for a first one of the plurality of RAKE fingers corresponds to a symbol of interest transmitted by a first transmitter and a delay for a second one of the plurality of RAKE fingers corresponds to an interfering symbol transmitted by a second transmitter wherein the second transmitter is located in a different location than the first transmitter;
    a processor configured to determine channel response estimates, a noise covariance estimate and a cross-correlation between the symbol of interest and the interfering symbol; and
    a combiner configured to combine the despread values corresponding to the symbol of interest and the interfering symbol using the channel response estimates, the noise covariance estimate and the cross-correlation to reduce interference attributable to the interfering symbol from the symbol of interest.

2. The RAKE receiver of claim 1, wherein the first one of the plurality of RAKE fingers is configured to despread the symbol of interest using a first despreading code and the second one of the plurality of RAKE fingers is configured to despread the interfering symbol using a second despreading code different from the first despreading code.

3. The RAKE receiver of claim 2, wherein the first and second despreading codes have spreading factors of different lengths.

4. The RAKE receiver of claim 3, wherein the processor is further configured to pad the shorter despreading code so that the spreading factors have the same length.

5. The RAKE receiver of claim 1, wherein the RAKE receiver and second transmitter are located in different cells of a wireless communication network.

6. The RAKE receiver of claim 5, wherein the second transmitter comprises an interfering base station.

7. The RAKE receiver of claim 5, wherein the second transmitter comprises an interfering mobile station.

8. The RAKE receiver of claim 1, wherein the processor is configured to determine a cross-correlation between the symbol of interest and the interfering symbol by estimating channel coefficients associated with the symbol of interest and the interfering symbol and determining the cross-correlation based on the estimated channel coefficients.

9. The RAKE receiver of claim 1, wherein the processor is configured to determine a cross-correlation between the symbol of interest and the interfering symbol by computing one of spreading code correlations and spreading waveform correlations associated with the symbol of interest and the interfering symbol and determining the cross-correlation based on the computed correlations.

10. The RAKE receiver of claim 1, wherein the combiner comprises a multi-channel filter.

11. A wireless communication device including the RAKE receiver as claimed in claim 1.

12. A method of reducing intersymbol interference from a symbol of interest in a multi-transmitter communication system comprising:
    despreading received symbols to obtain despread values, wherein the symbols include a symbol of interest transmitted by a first transmitter and an interfering symbol transmitted by a second transmitter wherein the second transmitter is located in a different location than the first transmitter;
    determining channel response estimates, a noise covariance estimate and a cross-correlation between the symbol of interest and the interfering symbol; and
    combining the despread values corresponding to the symbol of interest and the interfering symbol using weighting factors determined based on the channel response estimates, the noise covariance estimate and the cross-correlation to reduce the interference attributable to the interfering symbol from the symbol of interest.

13. The method of claim 12, wherein despreading received symbols to obtain despread values comprises:
    despreading the symbol of interest using a first despreading code; and
    despreading the interfering symbol using a second despreading code different from the first despreading code.

14. The method of claim 13, wherein the first and second despreading codes have spreading factors of different lengths.

15. The method of claim 14, further comprising padding the shorter despreading code so that the spreading factors have the same length.

16. The method of claim 12, wherein determining a cross-correlation between the symbol of interest and the interfering symbol comprises:
    estimating channel coefficients associated with the symbol of interest and the interfering symbol; and
    determining the cross-correlation between the symbol of interest and the interfering symbol based on the estimated channel coefficients.

17. A multi-code RAKE receiver for receiving signals in a multi-transmitter communication system comprising:
    a plurality of parallel RAKE receivers configured to provide RAKE output values for a plurality of code channels based on channel response estimates, wherein one of the code channels is associated with a symbol of interest transmitted by a first transmitter and a different one of the code channels is associated with an interfering symbol transmitted by a second transmitter wherein the second transmitter is located in a different location than the first transmitter;
    a processor configured to determine the channel response estimates, a noise covariance estimate and cross-correlations between symbol waveforms for the symbol of interest and the interfering symbol;
    a multi-channel filter configured to combine the RAKE output values to reduce interference attributable to the interfering symbol from the symbol of interest, the multi-channel filter comprising:
        a plurality of linear transversal filters, each of which is associated with a corresponding one of the plurality of parallel RAKE receivers, to weight and combine RAKE output values output by the corresponding RAKE receiver over a plurality of symbol periods using weighting factors determined based on the channel response estimates, the noise covariance estimate and the cross-correlations between the symbols to generate filtered output symbols; and
        a summer to combine the filtered output values to generate an estimate of a symbol of interest.

18. The multi-code RAKE receiver of claim 17, wherein the processor is configured to determine the cross-correlations between the symbol waveforms by estimating channel coefficients for the code channels associated with the symbol of interest and the interfering symbol and determining the cross-correlations between the symbol waveforms based on the channel coefficients.

19. The multi-code RAKE receiver of claim 17, wherein the processor is configured to determine the cross-correlations between the symbol waveforms by computing one of spreading code and spreading waveform correlations for the code channels associated with the symbol of interest and the interfering symbol and determining the cross-correlations between the symbol waveforms based on the correlations.

20. The multi-code RAKE receiver of claim 17, wherein a first one of the parallel RAKE receivers is configured to provide RAKE output values for the code channel associated with the symbol of interest based on a first despreading code and a second one of the parallel RAKE receivers is configured to provide RAKE output values for the code channel associated with the interfering symbol based on a second despreading code different from the first despreading code.

21. The multi-code RAKE receiver of claim 20, wherein the first and second despreading codes have spreading factors of different lengths.

22. The multi-code RAKE receiver of claim 21, wherein the processor is further configured to pad the shorter despreading code so that the spreading factors have the same length.

23. A wireless communication device including the multi-code RAKE receiver as claimed in claim 17.

24. A method of reducing interference from a symbol of interest in a multi-transmitter communication system comprising:
   despreading and combining symbols received over a plurality of code channels in a plurality of RAKE receivers to produce RAKE output values based on channel response estimates, wherein one of the code channels is associated with the symbol of interest transmitted by a first transmitter and a different one of the code channels is associated with an interfering symbol transmitted by a second transmitter wherein the second transmitter is located in a different location than the first transmitter;
   determining the channel response estimates, a noise covariance estimate and cross-correlations between different symbols;
   combining a plurality of RAKE output values output from each RAKE receiver over a plurality of symbol periods using weighting factors determined based on the channel response estimates, the noise covariance estimate and the cross-correlations between the symbols to generate a filtered output symbol for each RAKE receiver; and
   combining the plurality of filtered output symbols to generate an estimate of the symbol of interest with reduced multi-transmitter interference.

25. The method of claim 24, wherein despreading and combining symbols received over a plurality of code channels in a plurality of RAKE receivers to produce RAKE output values comprises:
   despreading and combining symbols received over the code channel associated with the symbol of interest in a first one of the parallel RAKE receivers based on a first despreading code; and
   despreading and combining symbols received over the code channel associated with the interfering symbol in a second one of the parallel RAKE receivers based on a second despreading code different from the first despreading code.

26. The method of claim 25, wherein the first and second despreading codes have spreading factors of different lengths.

27. The method of claim 26, further comprising padding the shorter despreading code so that the spreading factors have the same length.

* * * * *

UNITED STATES PATENT AND TRADEMARK OFFICE
CERTIFICATE OF CORRECTION

PATENT NO. : 7,738,534 B2  Page 1 of 1
APPLICATION NO. : 11/566820
DATED : June 15, 2010
INVENTOR(S) : Bottomley et al.

It is certified that error appears in the above-identified patent and that said Letters Patent is hereby corrected as shown below:

In Column 8, Line 65, in Equation (24), delete "$R_u$" and insert -- $R_u'$ --, therefor.

Signed and Sealed this

Twelfth Day of October, 2010

David J. Kappos
*Director of the United States Patent and Trademark Office*